United States Patent
Lee

(10) Patent No.: US 8,952,650 B2
(45) Date of Patent: Feb. 10, 2015

(54) DEVICE AND METHOD FOR CHARGING A MASTER DEVICE USING A DETACHABLE DEVICE

(75) Inventor: Hyangbok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 13/486,623

(22) Filed: Jun. 1, 2012

(65) Prior Publication Data
US 2013/0015808 A1 Jan. 17, 2013

(30) Foreign Application Priority Data
Jul. 15, 2011 (KR) .................. 10-2011-0070514

(51) Int. Cl.
*H02J 7/00* (2006.01)
*G06F 1/26* (2006.01)
*G06F 1/16* (2006.01)

(52) U.S. Cl.
CPC .............. *G06F 1/263* (2013.01); *G06F 1/1632* (2013.01)
USPC ............ 320/103; 320/134; 320/135; 320/148

(58) Field of Classification Search
CPC ......... H02J 7/0047; H02J 7/0052; H02J 9/00; H04W 4/00
USPC ................................... 320/103, 134–135, 148
See application file for complete search history.

(56) References Cited

U.S. PATENT DOCUMENTS

| | | | | |
|---|---|---|---|---|
| 5,610,498 | A * | 3/1997 | Oh ................................ | 320/163 |
| 6,459,175 | B1 * | 10/2002 | Potega .......................... | 307/149 |
| 6,744,698 | B2 * | 6/2004 | Koyama et al. ............... | 368/204 |
| 7,271,568 | B2 * | 9/2007 | Purdy et al. ................... | 320/106 |
| 7,327,544 | B2 * | 2/2008 | McClure et al. .............. | 361/91.5 |
| 7,960,944 | B2 * | 6/2011 | Hoffman et al. .............. | 320/107 |
| 7,990,106 | B2 * | 8/2011 | Hussain et al. ............... | 320/128 |
| 8,035,354 | B2 * | 10/2011 | Van Der Velden et al. ... | 320/159 |
| 8,044,639 | B2 * | 10/2011 | Tamegai et al. ............... | 320/138 |
| 2005/0174094 | A1 * | 8/2005 | Purdy et al. .................... | 320/134 |
| 2007/0214296 | A1 * | 9/2007 | Takamatsu et al. ............. | 710/63 |
| 2008/0258688 | A1 * | 10/2008 | Hussain et al. ................ | 320/145 |
| 2008/0315845 | A1 * | 12/2008 | Van Der Velden et al. ... | 320/162 |
| 2010/0231171 | A1 * | 9/2010 | De Cremoux ................. | 320/137 |
| 2011/0254501 | A1 * | 10/2011 | Izumi et al. .................... | 320/107 |

* cited by examiner

*Primary Examiner* — Naum B Levin
(74) *Attorney, Agent, or Firm* — Jefferson IP Law, LLP

(57) ABSTRACT

A charging control method of a master device receiving an operating power from an auxiliary battery device or an internal battery, the auxiliary battery device including a battery having a first power supply and a first power supply output port for outputting the first power supply, is provided. The method includes converting a second power supply to the first power supply upon detecting the second power supply at an input port of the master device in order to provide the converted first power supply as an operating power of the master device and/or a charging power of the internal battery, and detecting a connection with the auxiliary battery device upon detecting the first power supply at the input port in order to provide the first power supply as the operating power of the master device and/or the charging power of the internal battery without voltage drop.

19 Claims, 6 Drawing Sheets

DEVICE AND METHOD FOR CHARGING A MASTER DEVICE USING A DETACHABLE DEVICE

PRIORITY

This application claims the benefit under 35 U.S.C. §119 (a) of a Korean patent application filed on Jul. 15, 2011 in the Korean Intellectual Property Office and assigned Serial No. 10-2011-0070514, the entire disclosure of which is hereby incorporated by reference.

BACKGROUND OF THE INVENTION

1. Field of the Invention

The present invention relates to an apparatus and a method for charging a portable terminal using a battery. More particularly, the present invention relates to an apparatus and a method for charging a terminal by using a detachable device.

2. Description of the Related Art

A growing trend for portable terminals is to evolve from a terminal performing a single function, such as a portable cell phone, a camera or an audio player, to a terminal performing multiple functions. In other words, portable terminals may perform various multiple functions such as data communication, displaying or playing multimedia content, a camera, or other similar functions. The portable terminal may be a terminal such as a smart phone, a tablet, a netbook, or other similar portable electronic devices. By using such a portable terminal, a user may continuously perform various functions and, thus, may continuously execute an application that consumes a large amount of power. In this case, battery power consumption of the portable terminal is increased, thereby limiting an operation time of the portable terminal. Therefore, it is necessary to provide a function for enabling the portable terminal to operate for a long period of time. To this end, the portable terminal generally has an internal configuration comprising low power consumption devices. Also, an auxiliary battery may be used when connected to the portable terminal.

FIG. 1 is a view illustrating a configuration of a related art portable terminal including, a master device and a detachable device.

Referring to FIG. 1, a detachable device 10 includes a battery 13 that has a rated voltage of 3.7 volts (V). Also, an input port 11 for receiving data or a power supply from an external device receives an external power of 5 V, which is reduced by a charging unit 12 to a rated voltage of 4.2 V and is used to charge the battery 13. In addition, an output port 15 of the detachable device 10 is connected to an input port 21 of a master device 20 when a 5 V power supply is outputted and inputted through a V_BUS terminal that is a power supply terminal. Therefore, the detachable device 10 uses a DC/DC booster 14 for boosting a 4V power supply of a battery 13 to 5V between the battery 13 and the output port 15. In other words, the DC/DC booster 14 is used to boost the 4 V power supply outputted from the battery 13 to 5 V and output the boosted voltage to the master device 20.

When the detachable device 10 is charged as described above, an external 5 V power supply is inputted through input port 11, which may be a Universal Serial Bus (USB) port or an adaptor, and is reduced to 4.2 V through the charging unit 12 in order to charge the battery 13. When connected to the master device 20, the 4 V power supplied by the battery 13 is boosted to 5 V through the DC/DC booster 14 connected to the battery 13, and the boosted voltage is provided to the master device 20. Accordingly, when using the detachable device 10, as described above in the related art, a problem is caused such that an efficiency is decreased (by, for example, 90%) due to the DC/DC booster 14. Here, when an input voltage Vin of the DC/DC booster 14 is 4 V, an output voltage Vout is 5 V, and an output current Iout is 1 A, wherein the input current Iin is 1.25 A if the efficiency is 100% and about 1.4 A if the efficiency is 90%. Thus, power consumption of the battery 13 is increased by the DC/DC booster 14 connected to the battery 13.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for directly providing a power of a detachable device for supplying an auxiliary power to a master device. To this end, when connecting the detachable device, a rated power of the detachable device may be provided as a battery or operating power supply of the master device.

According to an aspect of the present invention, an apparatus for charging a master device using an auxiliary battery is provided. The apparatus includes an auxiliary battery device including a battery having a first power supply and a first power supply output port for outputting the first power supply, and the master device configured to receive an operating power from the auxiliary battery device or an internal battery, the master device including an input port including a first power supply input terminal and a second power supply input terminal, a charging unit, connected to the second power supply input terminal of the input port, for converting a second power supply to the first power supply upon detecting an input of the second power supply, for outputting the converted second power supply respectively to an operating power output terminal and a charging power output terminal, and for outputting a switching control signal, a switch, connected between the operating power output terminal and the charging power output terminal of the charging unit, for turning off when the second power supply is inputted, and for turning on when the second power supply is not inputted, and a system connected to the operating power output terminal of the charging unit in order to receive the operating power, wherein the internal battery of the master device is connected to the charging power output terminal of the charging unit in order to receive a charging power, and wherein, when the auxiliary battery device is connected to the input port, the first power supply of the auxiliary battery device is provided as at least one of the operating power of the system and the charging power of the internal battery without a voltage drop between the auxiliary battery device and at least one of the system and the internal battery.

According to another aspect of the present invention, a charging control method of a master device which receives an operating power from an auxiliary battery device or an internal battery, the auxiliary battery device including a battery having a first power supply and a first power supply output port for outputting the first power supply, is provided. The method includes converting a second power supply to the first power supply upon detecting an input of the second power supply from an input port of the master device, the input port including a first power supply input terminal and a second power supply input terminal, providing, via the second power supply input terminal, the converted first power supply as at least one of an operating power of the master device and a charging power of the internal battery of the master device, detecting a connection with the auxiliary battery device upon detecting an input of the first power supply from the input port; and providing the first power supply of the auxiliary battery device as at least one of the operating power of the master device and the charging power of the internal battery without voltage drop between the auxiliary battery device and the master device.

According to another aspect of the present invention, an auxiliary battery for charging a master device is provided. The auxiliary battery includes a battery, an output port connected to the master device, an input port connected to an external device providing a first power supply, a charging detection unit for detecting a connection of the external device, for generating a switch control signal according to the detecting of the connection of the external device, and for converting the first power supply provided by the external device into a second power supply, and a switch, connected between the battery and the output port, for turning off, according to the switch control signal, when the external device is connected, and for turning on when the external device is not connected, wherein, when the external device is connected, the second power supply is provided to the battery and the master device at the same time, and wherein, when the output port of the auxiliary battery device is connected to an input port of the master device, the second power supply is provided as at least one of an operating power of a system of the master device and a charging power of an internal battery of the master device without a voltage drop between the auxiliary battery device and at least one of the system and the internal battery.

According to another aspect of the present invention, a master device that receives operating power from an auxiliary battery device or an internal battery is provided. The master device includes an input port including a first power supply input terminal and a second power supply input terminal, a charging unit, connected to the second power supply input terminal of the input port, for converting a second power supply to the first power supply upon detecting an input of the second power supply, for outputting the converted second power supply respectively to an operating power output terminal and a charging power output terminal, and for generating a switching control signal, a switch, connected between the operating power output terminal and the charging power output terminal of the charging unit, for turning off when the second power supply is inputted, and for turning on when the second power supply is not inputted, and a system connected to the operating power output terminal of the charging unit in order to receive the operating power, wherein the internal battery of the master device is connected to the charging power output terminal of the charging unit in order to receive a charging power when the second power supply is inputted.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present exemplary embodiments of the present invention provide, in a detachable device, such as an auxiliary battery device, for providing an auxiliary power supply to a master device, an apparatus and a method for directly connecting a power supply of the detachable device to the master device. To achieve this, when connecting the detachable device to the master device, a rated power supply of a battery may be directly provided as a battery or may be used to provide operating power of the master device.

In the following description, a power supply of the battery may be a first power supply having a rated voltage of 3.7 volts (V). For illustrative purposes, in the present exemplary embodiments of the present invention, it is assumed that the rated voltage of the first power supply is 4 V. In addition, a second power supply may be a power supply from an external device, which is assumed herein as a Universal Serial Bus (USB) power supply, and may be a voltage of 5 V. However, the present invention is not limited thereto, and the external device may be any suitable power supply device, and the first power supply and the second power supply may have any suitable voltage values.

Figure 1:
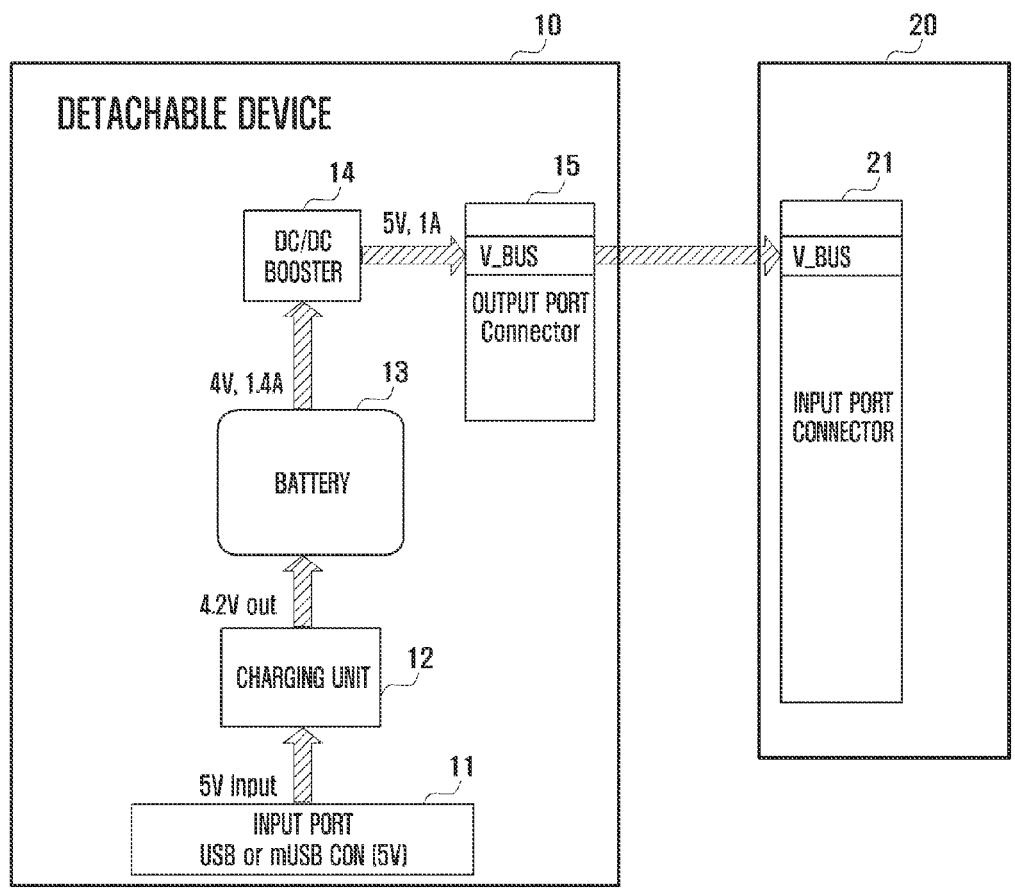
FIG. 1 illustrates a configuration of a related art portable terminal including, a master device and a detachable device.
Figure 2:
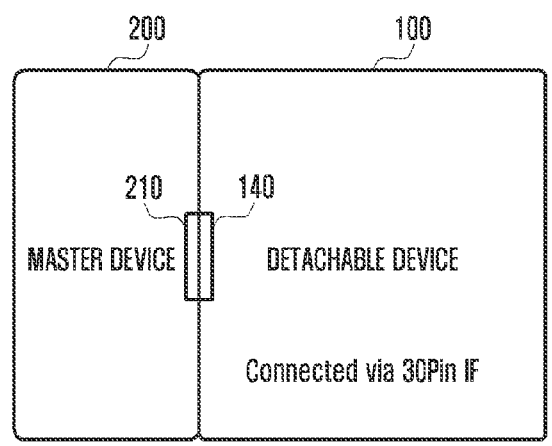
FIG. 2 illustrates a connection configuration between a master device and a detachable device according to an exemplary embodiment of the present invention.

FIG. 2 illustrates a connection configuration between a master device and a detachable device according to an exemplary embodiment of the present invention.

Referring to FIG. 2, an input port 210 of a master device 200 and an output port 140 of a detachable device 100, which may be an auxiliary battery, are respective parts of a connector that is mapped to corresponding pins in the respective input port 210 and the output port 140. The input port 210 and the output port 140 may each be a 30-pin connector, and an Interface (IF) pin map may have a configuration as shown in Table 1 below illustrating terminals 1-30 and corresponding labels.

TABLE 1

| 30 PIN IF | |
|---|---|
| 1 | GND |
| 2 | GND |
| 3 | USB_D+ |
| 4 | USB_D− |
| 5 | IF_CON_SENSE |
| 6 | V_ACCESSORY_5.0 V |
| 7 | V_BUS_5 V |
| 8 | V_BUS_5 V |
| 9 | VOUT_CHARGER (4 V) |
| 10 | VOUT_CHARGER (4 V) |
| 11 | NC |
| 12 | NC |
| 13 | ACCESSORY_ID |
| 14 | ACCESSORY_INT |
| 15 | GND |
| 16 | GND |
| 17 | MHL_D+ |
| 18 | MHL_D− |
| 19 | MHL_ID |
| 20 | UART_RX |
| 21 | UART_TX |
| 22 | NC |
| 23 | AP_TV_OUT |
| 24 | REMOTE_SENSE |
| 25 | NC |
| 26 | NC |
| 27 | EAR_L_CRADLE |
| 28 | EAR_R_CRADLE |
| 29 | 3.5_INT_TEST |
| 30 | GND |

In a case where the detachable device 100 is connected to the master device 200, the detachable device 100 sets an internal battery output path of the detachable device 100 such that the terminals 9 and 10, both being V_OUT CHARGER, of the output port 140 and the input port 210 are directly connected to each other. Thus, the mater device 200 may set a power supply path such that an output of the detachable device 100 inputted through the terminals 9 and 10 of the input port 210 may be used as an internal battery and/or operating power.

In a case where the external device, such as a Terminal Adaptor (TA) (not shown), is connected, it is detected that a power supply is inputted through terminals 7 and 8, both being V_BUS_5V. Here, the power supply inputted through the terminals 7 and 8 may be a 5 V power supply, such as a USB power supply, and therefore, the master device 200 drives an internal charging circuit to set a power supply path such that the external power supply can be used as the charging power of the battery and/or the operating power of the system.

Figure 3:
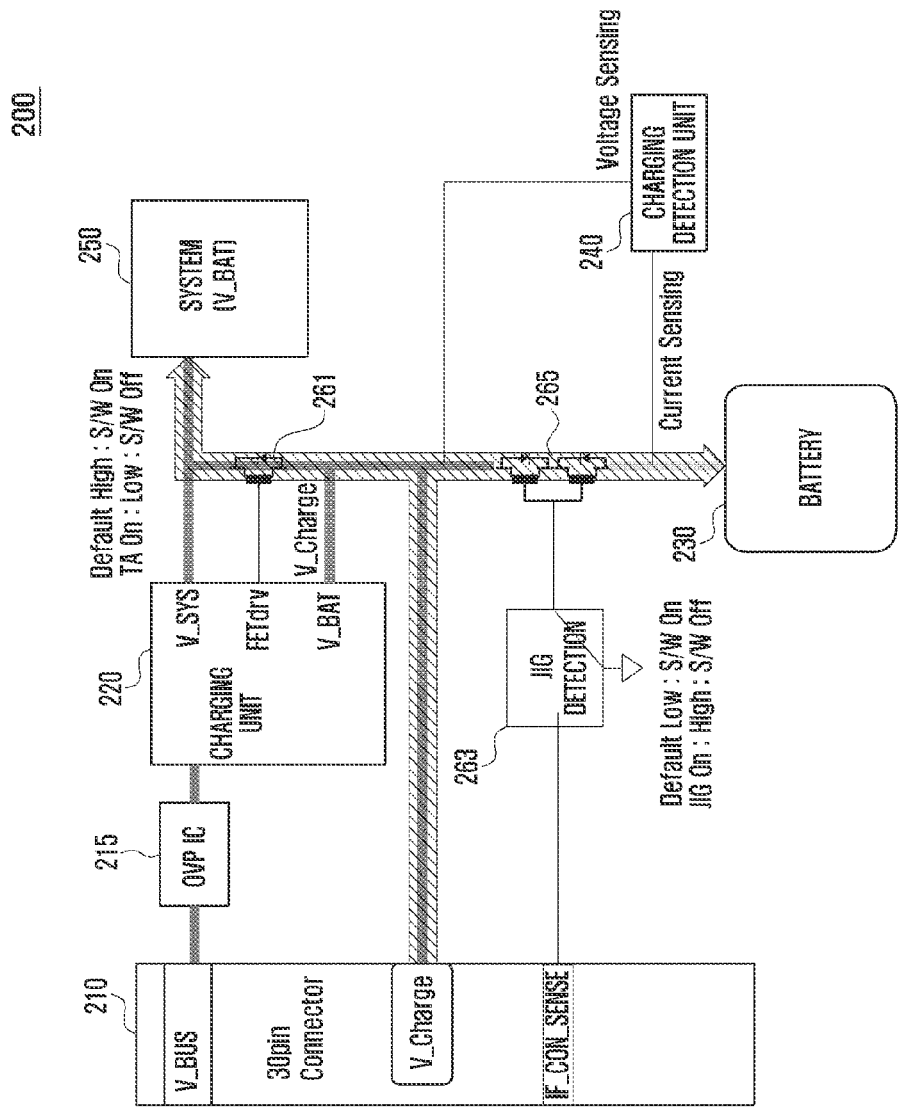
FIG. 3 illustrates an operation in a case where a detachable device is connected to a master device according to an exemplary embodiment of the present invention.
Figure 4:
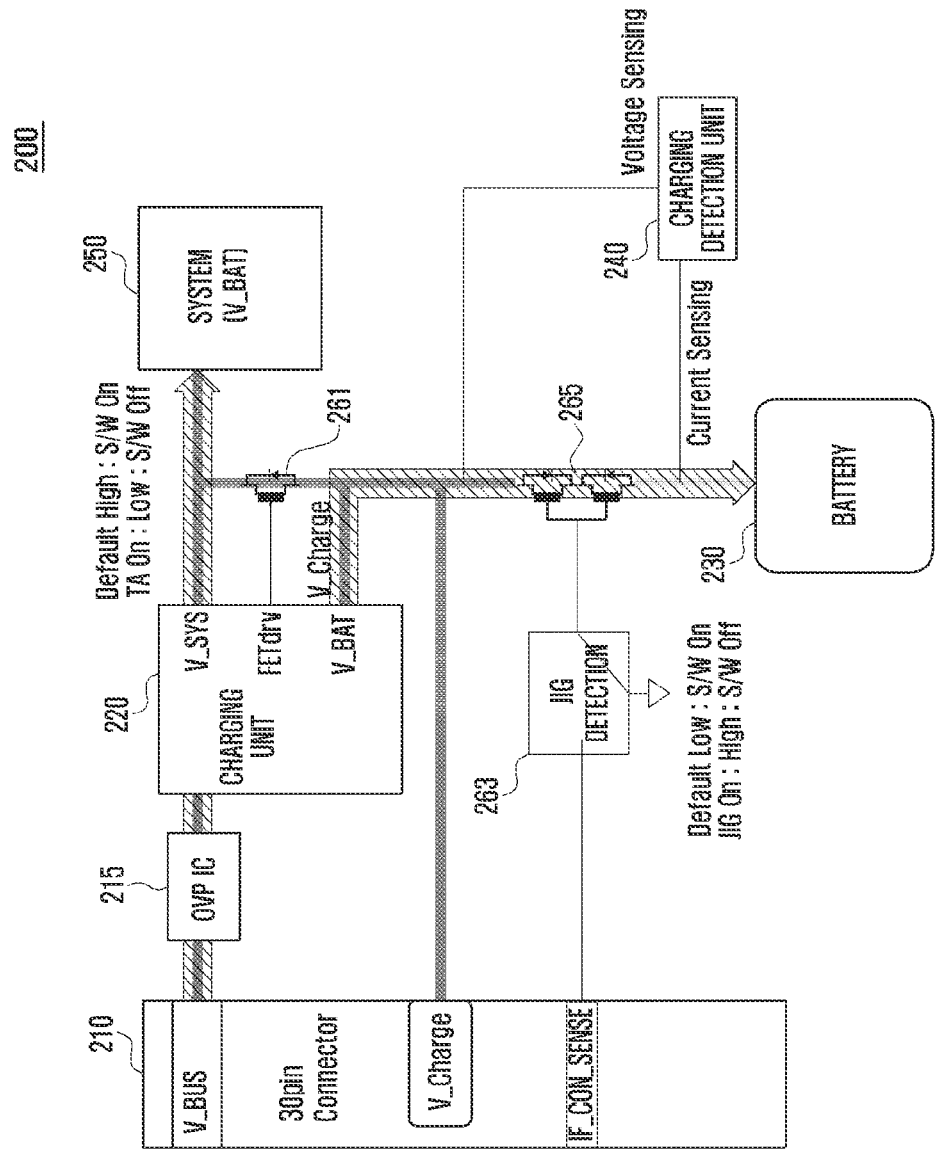
FIG. 4 illustrates an operation in a case where a Terminal Adapter (TA) is connected to a master device according to an exemplary embodiment of the present invention.

FIG. 3 illustrates an operation in a case where the detachable device 100 is connected to the master device 200 according to an exemplary embodiment of the present invention, and FIG. 4 illustrates an operation in a case where a TA is connected to a master device according to an exemplary embodiment of the present invention.

Referring to FIGS. 3 and 4, the master device 200 includes an input port 210 for connecting to the external device and the input port 210 may have a 30 pin connector with terminals 1-30 having a configuration as shown in Table 1 above. The input port 210 may include a V_BUS terminal to which a 5 V power supply may be applied and a V_CHARGE terminal to which a 4 V power supply may be applied. A system 250 may be a variety of respective elements that use the operating power of the master device 200, and a battery 230 may be a battery mounted on the master device 200. Also, a charging detection unit 240 controls a charging operation of the battery 230 by sensing a charging current and a charging voltage of the battery 230.

An Over Voltage Protector (OVP) Integrated Circuit (IC) 215 is a surge protection device that may be connected between the V_BUS terminal of the input port 210 and a charging unit 220. The charging unit 220 is connected to the V_BUS terminal and includes a V_SYS output terminal for supplying the operating power of the system 250, a V_BAT terminal, and a FETdrv terminal for controlling a switching operation of a switch 261.

The switch 261 is connected between the V_SYS output terminal and the V_BAT terminal and a switching operation of the switch 261 is controlled by an output of the FETdrv terminal of the charging unit 220. According to the present exemplary embodiment, it is assumed that an N-type Field Effect Transistor (FET) is used for the switch 261. However, the present invention is not limited thereto, and any suitable switch may be used for the switch 261. The charging unit 220, by default, outputs a high signal to the FETdrv terminal in order to turn on the switch 261 and outputs a low signal in order to turn off the switch 261 upon detecting a connection with the external TA. Therefore, the switch 261 maintains a default on state so as to form a power supply path between the system 250 and the battery 230, thereby providing a power supply from the battery 230 to the system 250. When the TA is connected to the master device 200, the power path between the system 250 and the battery 230 is cut off such that a power supply outputted through the V_SYS terminal of the charging unit 220 is provided to the system 250 as the operating power and a power supply outputted through the V_BAT terminal is provided as the charging power of the battery 230. In other words, the switch 261 is turned off according to the low signal generated when the TA is connected to the master device 200.

A switch 265 may be connected between the system 250 and the battery 230. In the present exemplary embodiment, it is assumed that the switch 265 is connected between the switch 261 and the battery 230 and is configured such that two P-type FET devices are connected to each other in series. A jig detection unit 263 detects when a jig is connected to the input port 210 and turns off the switch 265 in such a case, thereby interrupting the power supply path between the battery 230 and the system 250. In other words, in a default state, the switch 265 is turned on by a low signal from the jig detection unit 263 in order to form the power supply path between the battery 230 and the system 250 and is turned off by a high signal that is generated when the jig is detected to be connected to the input port 210, thereby interrupting the power supply path between the battery 230 and the system 250. Accordingly, the switch 265 is turned on according to the default low signal and turned off according to the high signal generated when the TA is connected is connected to the master device 200.

In the above described scenarios, when the detachable device 100 is connected to the input port 210, the switches 261 and 265 are in an ON state. Also, a 4 V power supply outputted from the detachable device 100 is applied to a V_Charge terminal of the input port 210. Since the switches 261 and 265 are turned on, the power supply inputted to the V_Charge terminal of the input port 210 is applied to at least one of the system 250 and the battery 230, as shown in FIG. 3. Therefore, the system 250 may use an output power of the detachable device 100 as the operating power without voltage drop, and the battery 230 may also use the power supply of the detachable device 100 without voltage drop.

In addition, when the TA is connected to the input port 210, the charging terminal 220 detects the connection of the TA and outputs a low signal to the FETdrv terminal. Accordingly, the switch 261 is turned off and the switch 265 is turned on. Also, the USB power of a 5 V power supply is inputted to the V_BUS terminal of the input port 210, and the charging unit 220 reduces a voltage to 4 V so as to be outputted to the V_SYS terminal and/or the V_BAT terminal. Here, the system 250 receives an output of the charging unit 220 outputted to the V_SYS terminal as an operating power supply and the battery 230 receives the output of the charging unit 220 outputted to the V_BAT terminal as an operating power supply. Since the switch 261 is turned off, a system operating power outputted to the V_SYS terminal and a charging power outputted to the V_BAT terminal have separate output paths.

As described above, when the detachable device 100 is connected to the input port 210, the master device 200 uses a 4 V battery power supply inputted through the V_Charge terminal as at least one of the system operating power and a battery charging power. Also, when the external USB power is connected to the input port 210, as shown in FIG. 4, the 5 V power inputted to the V_BUS terminal is reduced to 4 V so as to be provided as at least one of the system operating power and the battery charging power. Here, the switch 261 is turned off so that the system operating power and the battery charging power outputted from the charging unit 220 are respectively transmitted to the system 250 and the battery 230 along separate output paths.

Figure 5:
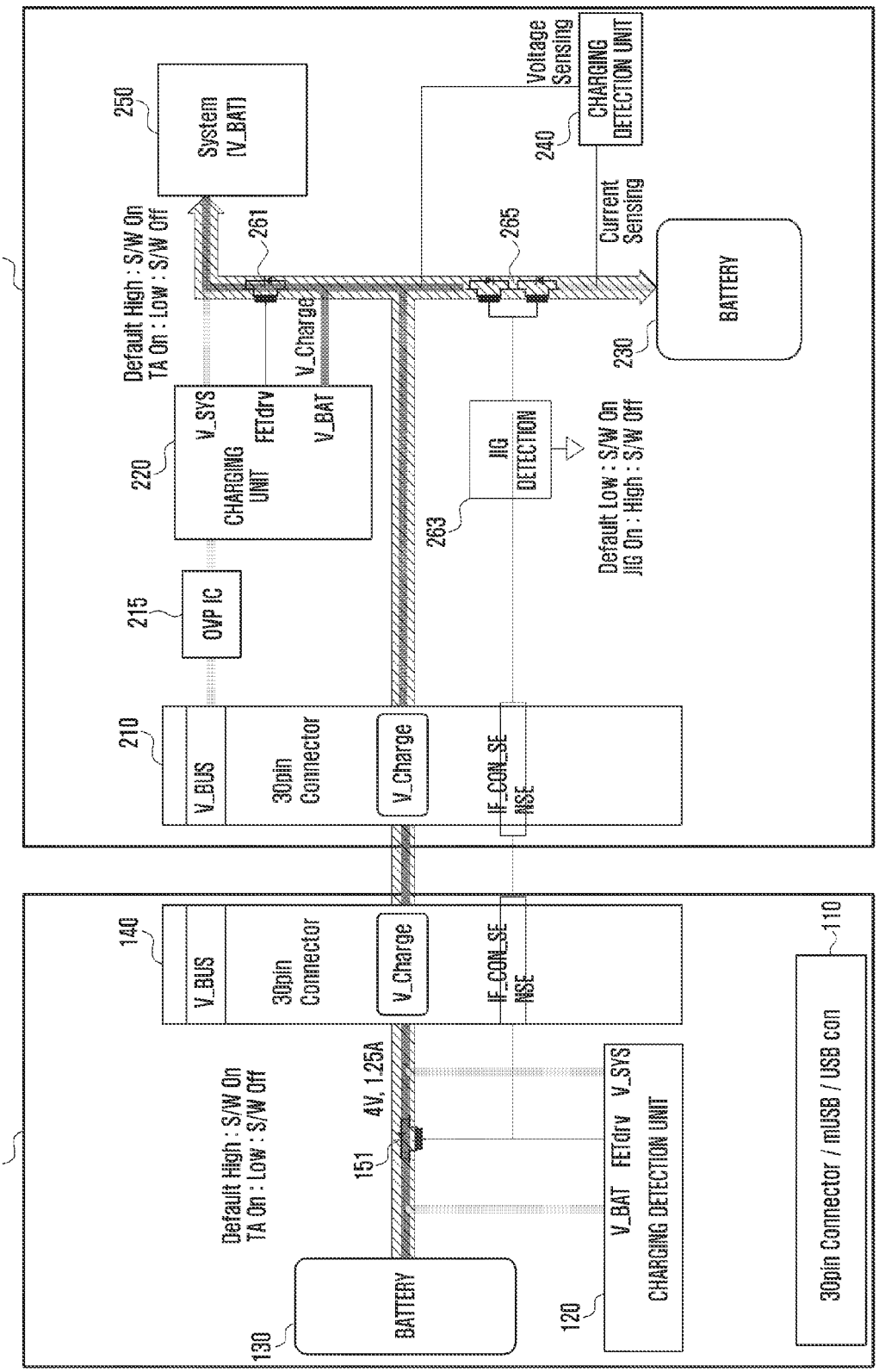
FIG. 5 illustrates a connection between a master device and a detachable device and illustrates an operation in a case where an external Universal Serial Bus (USB) power is not connected according to an exemplary embodiment of the present invention.
Figure 6:
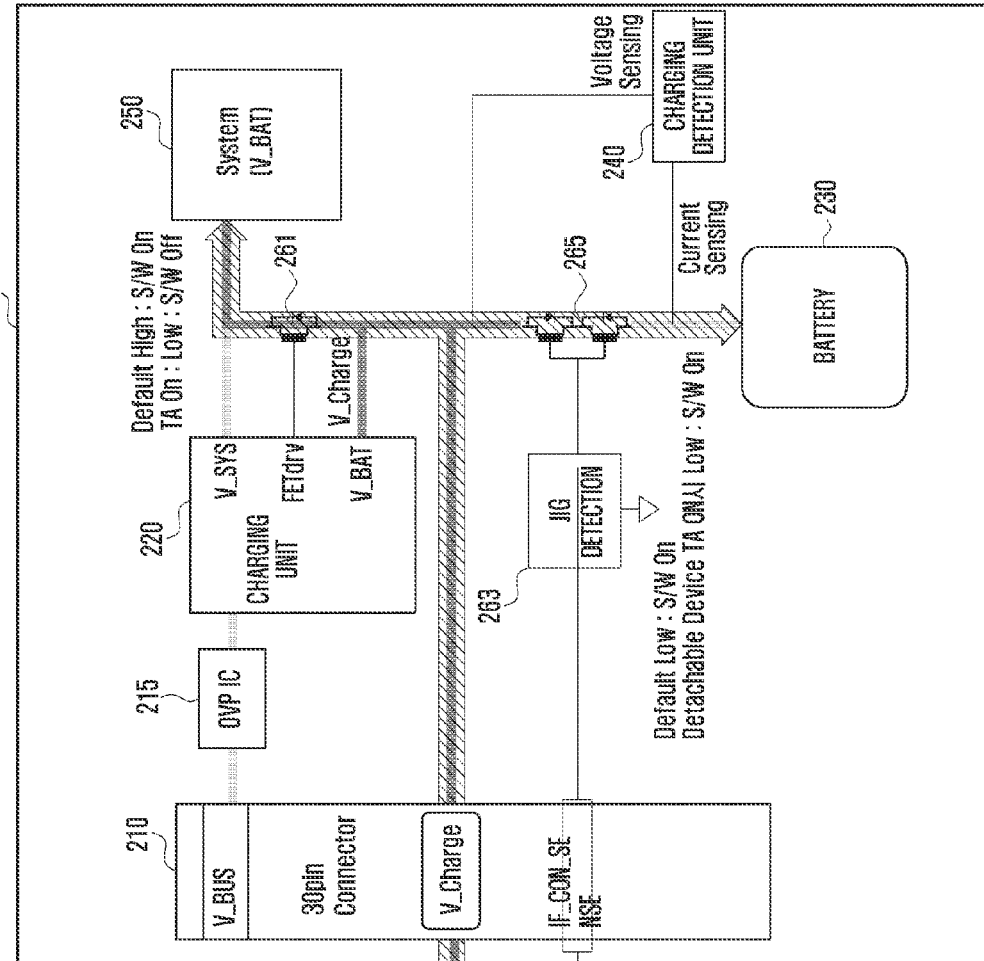
FIG. 6 illustrates a connection between a master device and a detachable device and illustrates an operation in a case where an external USB power is connected according to an exemplary embodiment of the present invention.
Figure 6:
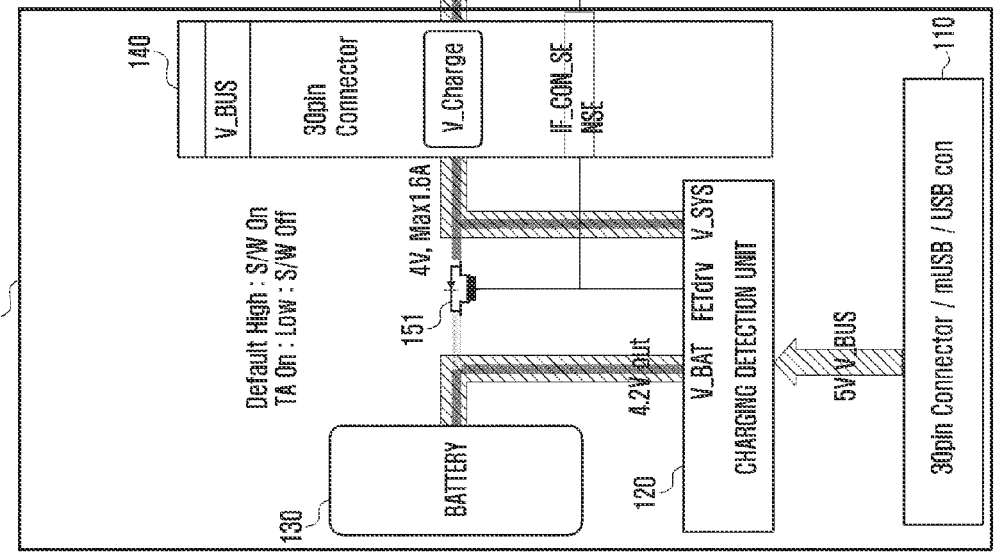

FIG. 5 illustrates a connection between the detachable device and the master device and illustrates an operation in a case where the external USB power is not connected according to an exemplary embodiment of the present invention, and FIG. 6 illustrates a connection between the detachable device and the master device and illustrates an operation in a case where an external USB power is connected according to an exemplary embodiment of the present invention.

Referring to FIGS. 5 and 6, a configuration of the detachable device 100 according to the present exemplary embodiment is described. The detachable device 100 includes a battery 130 having a rated voltage of 3.7 V, or any other suitable voltage value. An input port 110 may be connected to an external device, such as the TA, and may use the 30-pin connector with terminals 1-30 having a configuration as shown in Table 1. An output port 140 is connected to the input port 210 of the master device 200 and the output port 140 may also use the 30-pin connector with terminals 1-30 having a configuration as shown in Table 1. A switch 151 is connected between the battery 130 and the V_Charge terminal of the output port 140.

A charging detection unit 120 generates a switch control signal for controlling an operation of the switch 151, wherein the switch control signal is outputted via the FETdrv terminal of the charging detection unit 130 according to whether an external device is connected to the detachable device 100. When the external device is connected to the input port 110 of the detachable device, the switch 151 is turned off and the inputted 5 V power supply is reduced to the 4 V power supply in order to be respectively outputted to the V_BAT terminal and the V_SYS terminal, thereby providing the charging power of the battery 130 and the operating power of the master device 200. Also, when the external device is not connected, then the switch 151 is turned on so that an output of the battery 130 is provided to the master device 200 through the V_CHARGE terminal of the output port 140.

The master device 200 includes the input port 210 for connecting to the external device and the input port 210 includes the 30-pin connector with terminals 1-30 having a configuration as shown in Table 1. The input port 210 may include the V_BUS terminal for receiving the 5 V power supply and the V_CHARGE terminal for receiving the 4 V power supply. The system 250 may include various elements of the master device 200 and the battery 230 may be a battery mounted on the master device 200.

Also, the charging detection unit 240 detects the charging current and the charging voltage of the battery 230 in order to control a charging operation of the battery 230. Here, a device connected to the input port 210 may be the detachable device 100 or the external device, such as the TA. The OVP IC 215 is the surge protection device and may be connected between the V_BUS terminal of the input port 210 and the charging unit 220. The charging unit 220 is connected to the V_BUS terminal and includes the V_SYS output terminal for supplying the operating power of the system 250, the V_BAT terminal, and the FETdrv terminal for controlling a switching operation of the switch 261. The switch 261 is connected between the V_SYS output terminal and the V_BAT terminal and a switching operation thereof is controlled by an output of the FETdrv terminal of the charging unit 220.

FIG. 5 illustrates an operation of the detachable device 100, which may be an internal battery, in a case where an external device is not connected to the input port 110. In such a case, the switch 151 is switched on in a default state in which the external device is not connected and the switch 151 is switched off when the external device is connected. According to the present exemplary embodiment, the switch 151 is the N-type FET device. However, the present invention is not limited thereto, and any suitable switch may be used as the switch 151. When the external device is not connected, the charging unit 120 detects such event and outputs a high signal to the FETdrv terminal. Accordingly, the switch 151 is turned on, and when the detachable device 100 is connected to the master device 200, the power supply of the battery 130 is applied to the V_Charge terminal of the output port 140 through the switch 151. Therefore, the power outputted from the battery 130 is delivered to the master device 200 without a voltage drop so as to be provided as at least one of the operating power and the charging power.

FIG. 6 illustrates an operation of the detachable device 100 in a case where an external device is connected to the input port 110. Referring to FIG. 6, when the TA is connected to the input port, the charging unit 120 detects this event and outputs a low signal to the FETdrv terminal. Accordingly, the switch 151 is turned off, thereby interrupting a power supply path in which an output of the battery 130 is delivered to the master device 200. In this circumstance, when the USB power of the 5 V power supply is inputted to the V_BUS terminal of the input terminal 110, and the charging detection unit 120 reduces the power supply to 4 V power to be outputted to the V_SYS terminal and/or the V_BAT terminal of the charging detection unit 120. Here, the output of the charging detection unit 120 outputted to the V_SYS terminal of the charging detection unit 120 is transmitted to the V_Charge terminal of the output port 140 and is then provided to the master device 200 through the V_Charge terminal of the input port 210.

The master device 200 uses the voltage received on the V_Charge terminal as at least one of the operating power of the system 250 and the charging power of the battery 230. Also, the power outputted to the V_BAT terminal of the charging detection unit 120 is transmitted to the battery 130, and thus, the battery 130 may perform a charging operation using the power outputted from the charging detection unit 120. Here, the switch 151 is in an OFF state according to the control of the charging unit 120 so that an output path of V_SYS terminal and an output path of the V_BAT terminal of the charging detection unit 120 are separated. Accordingly, a power provided to the master device 200 and a charging power supply provided to the battery 130 are separated from each other.

Thus, in implementing the detachable device 100, when charging the battery of the master device 200 by using a battery disposed in the detachable device 100 and/or when providing the operating power of the master device 200, the power supply of the detachable device 100 may be directly provided to the master device 200 so that power consumption of the detachable device 100 may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for charging a master device using an auxiliary battery, the apparatus comprising:
    an auxiliary battery device including a battery having a first power supply and a first power supply output port for outputting the first power supply; and
    the master device configured to receive an operating power from the auxiliary battery device or an internal battery, the master device comprising:
        an input port including a first power supply input terminal and a second power supply input terminal;
        a charging unit, connected to the second power supply input terminal of the input port, for converting a second power supply to the first power supply upon detecting an input of the second power supply, for outputting the converted second power supply respectively to an operating power output terminal and a charging power output terminal, and for outputting a switching control signal;
        a switch, connected between the operating power output terminal and the charging power output terminal of the charging unit, for turning off when the second power supply is inputted, and for turning on when the second power supply is not inputted; and
        a system connected to the operating power output terminal of the charging unit in order to receive the operating power,
    wherein the internal battery of the master device is connected to the charging power output terminal of the charging unit in order to receive a charging power, and
    wherein, when the auxiliary battery device is connected to the input port, the first power supply of the auxiliary battery device is provided as at least one of the operating power of the system and the charging power of the internal battery without a voltage drop between the auxiliary battery device and at least one of the system and the internal battery.

2. The apparatus according to claim 1, wherein the auxiliary battery device further comprises:
    an input port connected to an external device for inputting the second power supply;
    a charging detection unit for generating an off switch control signal when the external device is connected, for converting the inputted second power supply to the first power supply, and for outputting the converted second power supply to the charging power output terminal and the operating power output terminal; and
    a switch, connected between the battery and the output port, for turning off, according to the off switch control signal of the charging detection unit, when the external device is connected, and for turning on when the external device is not connected,
    wherein, when the external device is connected, the converted second power supply is provided to the battery and the master device at the same time.

3. The apparatus according to claim 2, wherein each of the input ports and the output ports of the master device and the auxiliary battery device is a 30-pin connector including a first power supply port for the master device and a second power supply port for the auxiliary battery device.

4. The apparatus according to claim 3, wherein the first power supply has a rated voltage of 3.7 volts (V) and the second power supply has a rated voltage of 5 V.

5. The apparatus according to claim 4, wherein the second power supply of 5 V comprises a Universal Serial Bus (USB) power supply.

6. A charging control method of a master device which receives an operating power from an auxiliary battery device or an internal battery, the auxiliary battery device including a battery having a first power supply and a first power supply output port for outputting the first power supply, the method comprising:
    converting a second power supply to the first power supply upon detecting an input of the second power supply from an input port of the master device, the input port including a first power supply input terminal and a second power supply input terminal;
    providing, via the second power supply input terminal, the converted first power supply as at least one of an operating power of the master device and a charging power of the internal battery of the master device;
    detecting a connection with the auxiliary battery device upon detecting an input of the first power supply from the input port; and
    providing the first power supply of the auxiliary battery device as at least one of the operating power of the master device and the charging power of the internal battery without voltage drop between the auxiliary battery device and the master device.

7. The method according to claim 6, further comprising a switch connected between a path of the operating power of the master device and a path of the charging power of the internal battery,
    wherein, the switch is turned off when the second power supply is inputted such that the path of the operating power is separated from the path of the charging power, and
    wherein the switch is turned on when the first power supply is inputted such that the path of the operating power is not separated from the path of the charging power.

8. The method according to claim 6, further comprising:
    applying the first power supply of the auxiliary battery to the first power supply input terminal of the master device when the external device is not connected;

converting the second power supply, which is inputted, to the first power supply when the external device is connected; and providing the converted first power supply as at least one of the charging power of the auxiliary battery and a power supplied to the first power supply input unit of the master device.

9. The method according to claim 8, wherein the first power supply has a rated voltage of 3.7 V and the second power supply has a rated voltage of 5 V.

10. The method according to claim 9, wherein the second power supply of 5 V comprises a Universal Serial Bus (USB) power supply.

11. An auxiliary battery for charging a master device, the auxiliary battery comprising:
a battery;
an output port connected to the master device;
an input port connected to an external device providing a first power supply;
a charging detection unit for detecting a connection of the external device, for generating a switch control signal according to the detecting of the connection of the external device, and for converting the first power supply provided by the external device into a second power supply; and
a switch, connected between the battery and the output port, for turning off, according to the switch control signal, when the external device is connected, and for turning on when the external device is not connected,
wherein, when the external device is connected, the second power supply is provided to the battery and the master device at the same time, and
wherein, when the output port of the auxiliary battery device is connected to an input port of the master device, the second power supply is provided as at least one of an operating power of a system of the master device and a charging power of an internal battery of the master device without a voltage drop between the auxiliary battery device and at least one of the system and the internal battery.

12. The auxiliary battery according to claim 11, wherein the charging detection unit generates the switch control signal to turn off the switch when the external device is connected, and
wherein the charging detection unit generates the switch control signal to turn on the switch when the external device is not connected.

13. The auxiliary battery according to claim 11, wherein each of the input port and the output port of the auxiliary battery device is a 30-pin connector, and
wherein the output port includes a second power supply port.

14. The auxiliary battery according to claim 13, wherein the first power supply has a rated voltage of 5 volts (V) and the second power supply has a rated voltage of 3.7 V.

15. The auxiliary battery according to claim 14, wherein the first power supply of 5 V comprises a Universal Serial Bus (USB) power supply.

16. A master device that receives operating power from an auxiliary battery device or an internal battery, the master device comprising:
an input port including a first power supply input terminal and a second power supply input terminal;
a charging unit, connected to the second power supply input terminal of the input port, for converting a second power supply to the first power supply upon detecting an input of the second power supply, for outputting the converted second power supply respectively to an operating power output terminal and a charging power output terminal, and for generating a switching control signal;
a switch, connected between the operating power output terminal and the charging power output terminal of the charging unit, for turning off when the second power supply is inputted, and for turning on when the second power supply is not inputted; and
a system connected to the operating power output terminal of the charging unit in order to receive the operating power,
wherein the internal battery of the master device is connected to the charging power output terminal of the charging unit in order to receive a charging power when the second power supply is inputted.

17. The master device according to claim 16, wherein the charging unit generates the switch control signal to turn off the switch when the second power supply is inputted, and
wherein the charging unit generates the switch control signal to turn on the switch when the second power supply is not inputted.

18. The master device according to claim 16, wherein the input port is a 30-pin connector.

19. The auxiliary battery according to claim 18, wherein the first power supply has a rated voltage of 3.7 volts (V) and the second power supply has a rated voltage of 5 V.

* * * * *